(12) United States Patent
Sørensen et al.

(10) Patent No.: US 10,602,270 B1
(45) Date of Patent: Mar. 24, 2020

(54) SIMILARITY MEASURE ASSISTED ADAPTATION CONTROL

(71) Applicant: MICROSOFT TECHNOLOGY LICENSING, LLC, Redmond, WA (US)

(72) Inventors: Karsten Vandborg Sørensen, Aalborg (DK); Puneet Rana, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/206,213

(22) Filed: Nov. 30, 2018

(51) Int. Cl.
*H04R 3/04* (2006.01)
*G06N 20/00* (2019.01)
*G10L 21/0224* (2013.01)
*G10L 21/0208* (2013.01)

(52) U.S. Cl.
CPC .............. *H04R 3/04* (2013.01); *G06N 20/00* (2019.01); *G10L 21/0224* (2013.01); *G10L 2021/02082* (2013.01)

(58) Field of Classification Search
CPC ....... G10L 21/0208; G10L 2021/02082; G10L 21/0224; H04M 9/082; H04M 9/08; H04R 3/04; G06N 20/00
USPC .......................................... 379/406.1–406.14
See application file for complete search history.

(56) References Cited

U.S. PATENT DOCUMENTS

| | | | | |
|---|---|---|---|---|
| 7,747,002 B1* | 6/2010 | Thi | ........................... | H04B 3/23 379/406.08 |
| 8,983,057 B1* | 3/2015 | Deng | .................... | H04M 9/082 379/406.06 |
| 2005/0129225 A1* | 6/2005 | Piket | ..................... | H04M 9/082 379/406.01 |
| 2009/0185515 A1 | 7/2009 | Sorensen et al. | | |
| 2009/0185674 A1 | 7/2009 | Sorensen et al. | | |
| 2010/0057454 A1* | 3/2010 | Mohammad | ........... | H04B 3/234 704/233 |
| 2011/0112668 A1 | 5/2011 | Sorensen et al. | | |
| 2011/0112831 A1 | 5/2011 | Sorensen et al. | | |
| 2012/0163612 A1 | 6/2012 | Sorensen et al. | | |
| 2012/0207327 A1 | 8/2012 | Sorensen et al. | | |
| 2012/0295562 A1 | 11/2012 | Sorensen et al. | | |
| 2012/0303363 A1 | 11/2012 | Sorensen | | |
| 2013/0013303 A1 | 1/2013 | Strommer et al. | | |
| 2013/0129100 A1 | 5/2013 | Sorensen | | |

(Continued)

*Primary Examiner* — Jason R Kurr
(74) *Attorney, Agent, or Firm* — NovoTechIP International PLLC

(57) ABSTRACT

Techniques for real-time audio communication including supplying an initial audio signal to an audio signal processor configured to process the initial audio signal and output a processed audio signal to an audio output means, obtaining a loopback audio signal corresponding to the processed audio signal, generating a plurality of audio features for the initial audio signal and the loopback audio signal, generating a similarity measure estimating a similarity of the initial audio signal to the first loopback audio signal based on at least the plurality of audio features, adjusting an adaptation rate for an audio signal processing operation based on at least the similarity measure, and controlling, based on at least the adjusted adaptation rate, an echo cancellation process for cancelling an estimated echo from a near-end audio signal received via an audio input means in proximity to the audio output means.

20 Claims, 11 Drawing Sheets

(56) References Cited

U.S. PATENT DOCUMENTS

| | | |
|---|---|---|
| 2013/0191119 A1* | 7/2013 | Sugiyama ................ H04B 3/23 |
| | | 704/226 |
| 2013/0230086 A1 | 9/2013 | Sorensen |
| 2013/0346346 A1 | 12/2013 | Criminisi et al. |
| 2014/0122381 A1 | 5/2014 | Nowozin |
| 2014/0172753 A1 | 6/2014 | Nowozin et al. |
| 2014/0177822 A1 | 6/2014 | Sorensen |
| 2014/0324420 A1 | 10/2014 | Sorensen et al. |
| 2014/0334631 A1 | 11/2014 | de vicente pena et al. |
| 2014/0365752 A1 | 12/2014 | Howes et al. |
| 2015/0154977 A1 | 6/2015 | Ekman et al. |
| 2015/0181017 A1* | 6/2015 | Mani ................... H04M 9/082 |
| | | 379/406.08 |
| 2015/0222988 A1 | 8/2015 | Sorensen |
| 2015/0248764 A1 | 9/2015 | Keskin et al. |
| 2015/0248765 A1 | 9/2015 | Criminisi et al. |
| 2017/0103774 A1 | 4/2017 | Sorensen |
| 2017/0132496 A1 | 5/2017 | Shoaib et al. |
| 2017/0206431 A1 | 7/2017 | Sun et al. |
| 2017/0236286 A1 | 8/2017 | Fanello et al. |
| 2017/0262768 A1 | 9/2017 | Nowozin et al. |
| 2019/0074025 A1* | 3/2019 | Lashkari ................. H04R 3/02 |
| 2019/0220698 A1 | 7/2019 | Pradeep |

* cited by examiner

SIMILARITY MEASURE ASSISTED ADAPTATION CONTROL

BACKGROUND

In voice-over-IP (VoIP) calls on platforms that provide a loopback signal, the signal level of the loopback signal can be observed to change quite drastically due to external playout effects introduced by an audio driver or hardware device, such as with effects directed to providing loudness enhancements, dynamic range compression, noise suppression, or speaker protection. These changes can be misclassified by audio signal activity detectors, which in turn leads to various forms of degradation in echo cancellation performance, such as incomplete echo cancellation and/or fading of near-end speech signals captured by a microphone.

SUMMARY

A real-time audio communication system, in accordance with a first aspect of this disclosure, including one or more processors and a machine-readable storage medium. The storage medium stores instructions which, when executed by the one or more processors, cause the system to receive an audio transmission via a communication network, generate an initial audio signal based on at least the received audio transmission, and supply the initial audio signal to an audio signal processor configured to process the initial audio signal and output a processed audio signal to an audio output means. The instructions also cause the system to obtain a loopback audio signal corresponding to the processed audio signal, generate a plurality of audio features for the initial audio signal and the loopback audio signal, and generate a similarity measure estimating a similarity of the initial audio signal to the loopback audio signal based on at least the plurality of audio features. In addition, the instructions cause the system to adjust an adaptation rate for an audio signal processing operation based on at least the similarity measure, and control, based on at least the adjusted adaptation rate, an echo cancellation process for cancelling an estimated echo from a near-end audio signal received via an audio input means in proximity to the audio output means.

A method of processing audio signals, in accordance with a second aspect of this disclosure, including receiving an audio transmission via a communication network, generating an initial audio signal based on at least the received audio transmission, and supplying the initial audio signal to an audio signal processor configured to process the initial audio signal and output a processed audio signal to an audio output means. The method further includes obtaining a loopback audio signal corresponding to the processed audio signal, generating a plurality of audio features for the initial audio signal and the loopback audio signal, and generating a similarity measure estimating a similarity of the initial audio signal to the loopback audio signal based on at least the plurality of audio features. In addition, the method includes adjusting an adaptation rate for an audio signal processing operation based on at least the similarity measure, and controlling, based on at least the adjusted adaptation rate, an echo cancellation process for cancelling an estimated echo from a near-end audio signal received via an audio input means in proximity to the audio output means.

A real-time audio communication system, in accordance with a third aspect of this disclosure, including means for receiving an audio transmission via a communication means, means for generating an initial audio signal based on at least the received audio transmission, means for processing the initial audio signal and outputting a processed audio signal to an audio output means, and means for obtaining a loopback audio signal corresponding to the processed audio signal. The system also includes means for generating a plurality of audio features for the initial audio signal and the loopback audio signal, and means for generating a similarity measure estimating a similarity of the initial audio signal to the loopback audio signal based on at least the plurality of audio features. In addition, the system includes means for adjusting an adaptation rate for an audio signal processing operation based on at least the similarity measure, and means for controlling, based on at least the adjusted adaptation rate, an echo cancellation process for cancelling an estimated echo from a near-end audio signal received via an audio input means in proximity to the audio output means.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Figure 1:
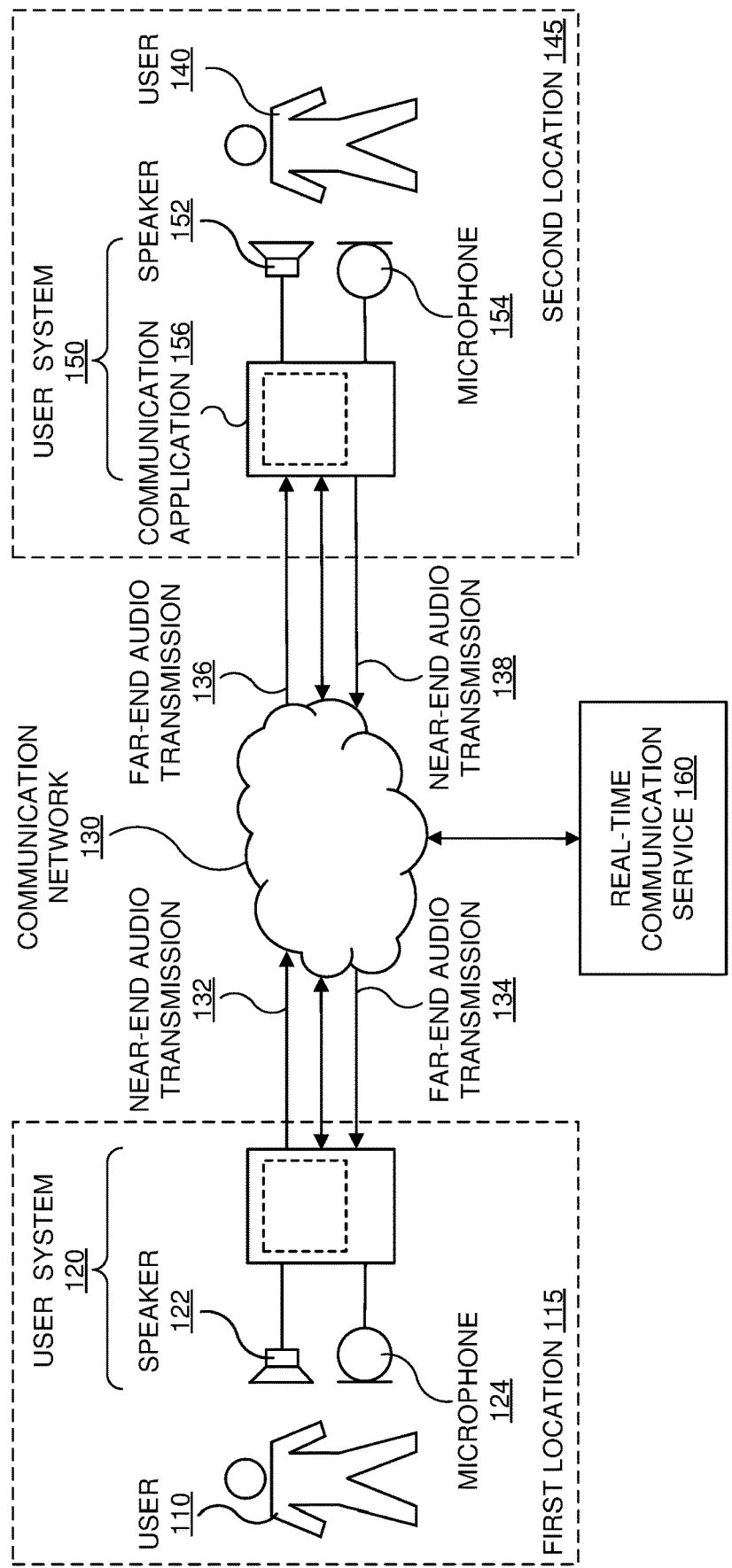
FIG. 1 illustrates an example communication system.

FIG. 1 illustrates an example communication system 100 comprising a first user system 120 being utilized at a first geographic location 115 (which may be more simply referred to as a "location") by a first user 110 ("User A") associated with the first user system 120, a second user system 150 being utilized at a second geographic location 145 by a second user 140 ("User B") associated with the second user system 150, and a communication network 130 (which may be more simply referred to as a "network") by which the first user system 120 and the second user system 150 exchange data. In some examples, user system 120 and/or user system 150 by each be referred to as a "user device." The second location 145 is different than the first location 115, and as a result is not in acoustic proximity to the first user system 120 (meaning that a microphone 154 included in the second user system 150 does not receive acoustic signals generated by a speaker 122 included in the first user system 120). In other examples, the communication system 100 may comprise any number of users and associated user systems.

The first and second user systems 120 and 150 can communicate over the communication network 130 in the communication system 100, thereby allowing the users 110 and 140 to communicate with each other over the communication network 130. The communication network 130 may, in some examples, include the Internet. Each of the first and second user systems 120 and 150 may be, for example, a mobile phone, a tablet, a laptop, a personal computer ("PC") (including, for example, PCs running a Windows™, Mac OS™ or Linux™ operating system), a gaming device, a television, a personal digital assistant ("PDA") or other device able to communicate via the communication network 130. The second user system 150 is arranged to receive information from and output information to the second user 140 of the second user system 150. The second user system 150 comprises output means such as a display and one or more speakers 152. The second user system 150 also comprises input means such as a keyboard, a touch-screen, one or more microphones 154 for receiving audio signals, and/or a camera for capturing images of a video signal. An "audio signal" may also be referred to as an "audio stream."

At a time shown in FIG. 1, the first and second users 110 and 140 are both participating in an electronic real-time audio communication session (which may be more simply referred to as a "real-time communication session" or a "communication session") via their respective user systems 120 and 150. In some examples, the real-time audio communication session is provided as part of a real-time multimedia communication session involving one or more communication modalities in addition to audio; such as, but not limited to, a videoconferencing session also involving real-time video communication. In this example, the second user system 150 executes an instance of a communication application 156 which, when executed by the second user system 150, allows the second user system 150 to participate in the real-time audio communication session with the first user system 120. In some implementations, the communication application 156 is obtained from and/or communication sessions are established via a real-time communication service 160 available via the communication network 130. In the real-time audio communication session, the communication application 156 is configured to, among other things, receive far-end audio transmissions 136 from the first user system 120 via the communication network 130, present far-end audio received in the far-end audio transmissions 136 via the speaker 152, capture near-end audio (such as speech of the second user 140) via the microphone 154, and transmit near-end audio transmissions 158 for the captured near-end audio to the first user system 120. The first user system 120 may be configured in much the same manner described for the second user system 150, including transmitting near-end audio transmissions 132 (received as far-end audio transmissions 136 by the second user system 150) and receiving far-end audio transmissions 134 (transmitted by the second user system 150 as near-end audio transmissions 158), although there may be various differences in features implemented by the first user system 120. Users engaged in the real-time audio communication session may be referred to as "participants" of the real-time audio communication session. In some circumstances, two or more participants may simultaneously make use of a single user system during a communication session, a number of participants making use of a same system may change during a communication session, and a number of user systems participating in a communication session may change during the communication session.

The second user device 150 is configured to perform acoustic echo cancellation. There are two main approaches for acoustic echo cancellation: echo subtraction and echo suppression. Often these two approaches are combined.

A near-end audio signal captured by a microphone 124 of the first user system 120 is, after being processed by the first user system 120, transmitted over the communication network 130 in near-end audio transmissions 132 for playing out by the second user system 120 via the speaker 152. The microphone 154 of the second user system 150 captures an echo of the audio signal played out via the speaker 152 (including the audio signal received from the first user system 120 in far-end audio transmissions 136). If that echo captured by the microphone 154 is not substantially cancelled, then the second user system 150 will transmit the echoed audio signal back in near-end audio transmission 158 to the first user system 120 that originally captured it. As a result, the echoed audio signal received by the first user system 120 from the second user system 150 in far-end audio transmissions 134 is played out through a speakers of the first user system 120, resulting in the first user 110 hearing a delayed echo of audio captured by the first user system 120 at the first location 115. This can include a delayed echo of spoken audio initially uttered by the first user 110, which results in a very poor user experience and can frustrate spoken communication.

The second user system 150 includes an audio signal processor configured to perform audio processing functions for the second user system 150. The audio signal processor may include an audio hardware endpoint device (which may be referred to as a "sound card") that performs analogue to digital conversion (ADC) for capturing audio at the microphone 154 and performs digital to analogue conversion (DAC) of digital audio signals for playing out using the speaker 152. The audio signal processor may further include operating system (OS) components such as, but not limited to, a device driver specific to the audio hardware device and/or an audio software framework (which may be referred to as an "audio stack" or an "audio engine") and associated application programming interfaces (APIs) used by applications to output application-provided audio signals and receive input audio.

It is becoming increasingly common for audio signal processors to include OS components (such as, but not limited to, device drivers) that introduce effects to application-provided audio signals on the play out signal output via the speaker 152 in an attempt to improve the user experience. Examples of such effects include, but are not limited to, loudness enhancements, dynamic range compression, noise suppression, and speaker protection. Those effects are performed by signal processing components in the audio signal processor whose functionality is unknown to, and often outside the control of, applications using OS-provided APIs to render audio signals for being played out.

Playout effects introduced by an audio signal processor cause difficulties for echo cancellation performed by the communication application, as these effects applied to an audio signal provided by the communication application are effectively part of the echo path as seen by the echo canceller. However, in contrast to actual acoustic echo introduced as acoustic waves travel from the speaker 152 to the microphone 154, whether directly or by reflection, playout effects introduced by an audio signal processor may be highly time-varying and/or nonlinear, which many echo cancellers are not well adapted to handle. However, some operating systems include functionality for feeding back to an application the audio signal that is going to be played out, including any effects that have been introduced by an audio signal processor, and which may at times include a "system mix" of audio signals from multiple sound-rendering applications. An example of this functionality is the Windows Audio Session API (WASAPI) loopback recording mode. This audio signal that is fed back to the application is referred to as a "loopback signal" or "far-end loopback signal." The loopback signal contains all of the nonlinear and/or time-varying playout effects. In some examples, nonlinear effects will boost low-level (i.e., low amplitude) signals more than high-level (i.e., high amplitude) signals. Furthermore, it also typically includes a "system mix" of audio being played out for all audio-rendering application, and as a result the loopback signal may include music or other sounds from other applications that is being played out by speaker 152. The loopback signal is often made available for echo cancellers to use as reference signal, as the inclusion of these additional sounds in the reference signal can be useful for an echo canceller adapted to also cancel out sounds of audio rendered for other applications during a communication session.

Figure 2:
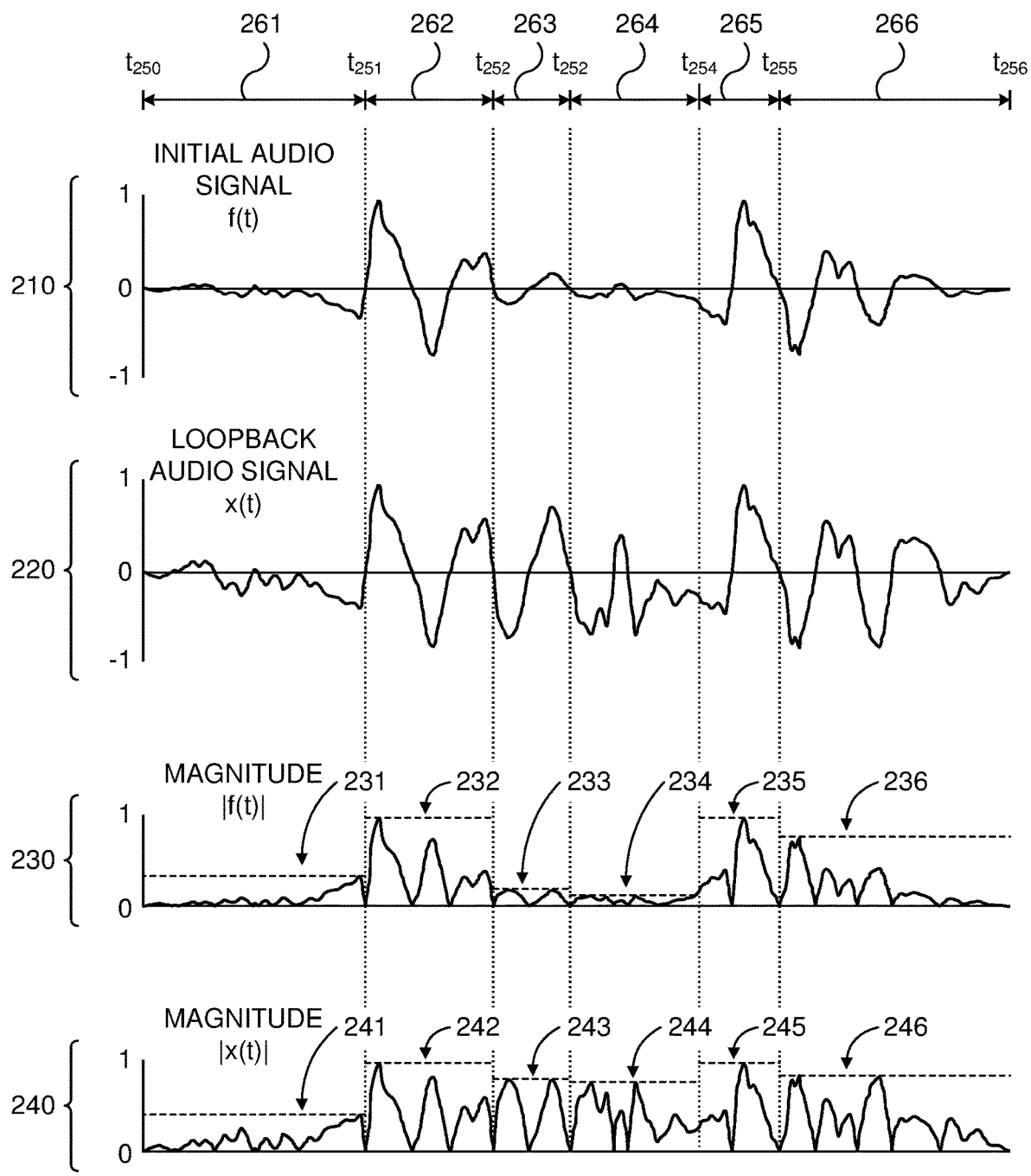
FIG. 2 illustrates an example of a problem encountered with playout effects introduced by some audio signal processors.

FIG. 2 illustrates an example of a problem encountered with playout effects introduced by some audio signal processors. In this example, four audio graphs 210, 220, 230, and 240 are shown in connection with an initial audio signal f(t) output from the communication application 156 during a period of time from a time $t_{250}$ to a time $t_{256}$ (with intervening times $t_{251}$, $t_{252}$, $t_{253}$, $t_{254}$, and $t_{255}$). The first graph 210 shows the initial audio signal f(t). The second graph 220 shows a corresponding loopback audio signal x(t) resulting from example effects applied by an audio signal processor. In this example, the loopback audio signal f(t) does not include audio from any other applications. The third graph 230 shows the initial audio magnitude |f(t)|, the magnitude of the initial audio signal f(t) from the first graph 210. The fourth graph 240 shows the loopback audio magnitude |x(t)|, the magnitude of the loopback audio signal x(t) from the second graph 220.

The period of time shown in FIG. 2 is divided into six time periods 261, 262, 263, 264, 265, and 266. The third graph 230 shows respective peak magnitudes 231, 232, 233, 234, 235, and 236 for the initial audio magnitude |f(t)|. The fourth graph 240 shows respective peak magnitudes 241, 242, 243, 244, 245, and 246 for the loopback audio magnitude |x(t)|. For the first two time periods 261 and 262, the peak magnitudes 241 and 242 for the loopback audio magnitude |x(t)| are roughly consistent with the peak magnitudes 231 and 232 for the initial audio magnitude |f(t)|. However, although during the next two time periods 263 and 264 the for the initial audio magnitude |f(t)| shows low peak magnitudes 233 and 234 (which may correspond to noise included in the initial audio signal f(t)), the peak magnitude 243 of the loopback audio magnitude |x(t)| is much higher than the peak magnitude 233, and the peak magnitude 244 of the loopback audio magnitude |x(t)| is higher than the peak magnitude 234 by an even greater degree. In this example, essentially the audio signal processor suddenly increased the gain at the time $t_{252}$, and further increased the gain at the time $t_{253}$, resulting in very different signal energies between the initial audio signal f(t) and its corresponding loopback audio signal x(t) during the time periods 263 and 264.

A problem that arises from such sudden increases in the gain is that in some implementations activity detection (which, in some examples, may be referred to as "voice activity detection") is performed based on loopback audio signal energy. For example, a loopback noise estimate based on the loopback audio signal x(t) may be updated during periods of estimated inactivity, and the noise estimate may be used to identify periods of activity, during which the echo path may be updated. However, with a sudden increase in gain, as shown at time $t_{252}$, activity detection misclassifies the time periods 263 and 264 as having activity when, as seen from the initial audio signal f(t), they should have been classified as inactive. If the gain continues to be applied for a sufficient period of time, a noise estimator may eventually adapt, but activity detection failures are likely to occur until that happens.

These activity detection failures can lead to various problems. For example, certain stages of near-end signal processing may be configured to operate differently during active and inactive periods, and misclassification can result in incorrect processing. Additionally, where the echo path is updated more quickly during active periods, misclassification of an inactive period as active can cause errors in estimating the echo path for later echo cancellation, which can result in incomplete echo cancellation for actual activity and/or fadeout of a near-end signal. Also, where the noise estimate is updated more quickly during inactive periods, failure to correctly identify inactive periods can significantly slow down adaptation to the gain-increased loopback noise level. Each of these result in degraded signal processing of a near-end speech signal captured by the microphone 154, such as incomplete echo cancellation and/or speech signal fadeout, that degrade the experience for other participants, such as the first user 110, and in extreme situations negatively impacts the ability of participants to communicate effectively. Also, as an affected participant generally does not hear the degraded audio signals, it is difficult for the affected participant to know when degradation occurs and attempt to minimize it.

However, merely looking for significant differences in energy between an initial audio signal and its counterpart loopback audio signal is not an effective approach for automatically addressing this problem. This is because where loopback activity detection is desired to perform echo cancellation of audio played out for other applications during a communication session, sudden increases in signal energy can properly occur due to audio from another application with a sudden increase in signal energy being mixed with audio from the communication application 156, rather than as a result of problematic playout effects. In such situations, the loopback signal should be classified as active, allowing accurate echo cancellation of the mixed audio signal to be performed. Thus, there is a need to accurately and automatically identify occurrences of problematic playout effects that degrade noise level estimation or echo cancellation.

Figure 3:
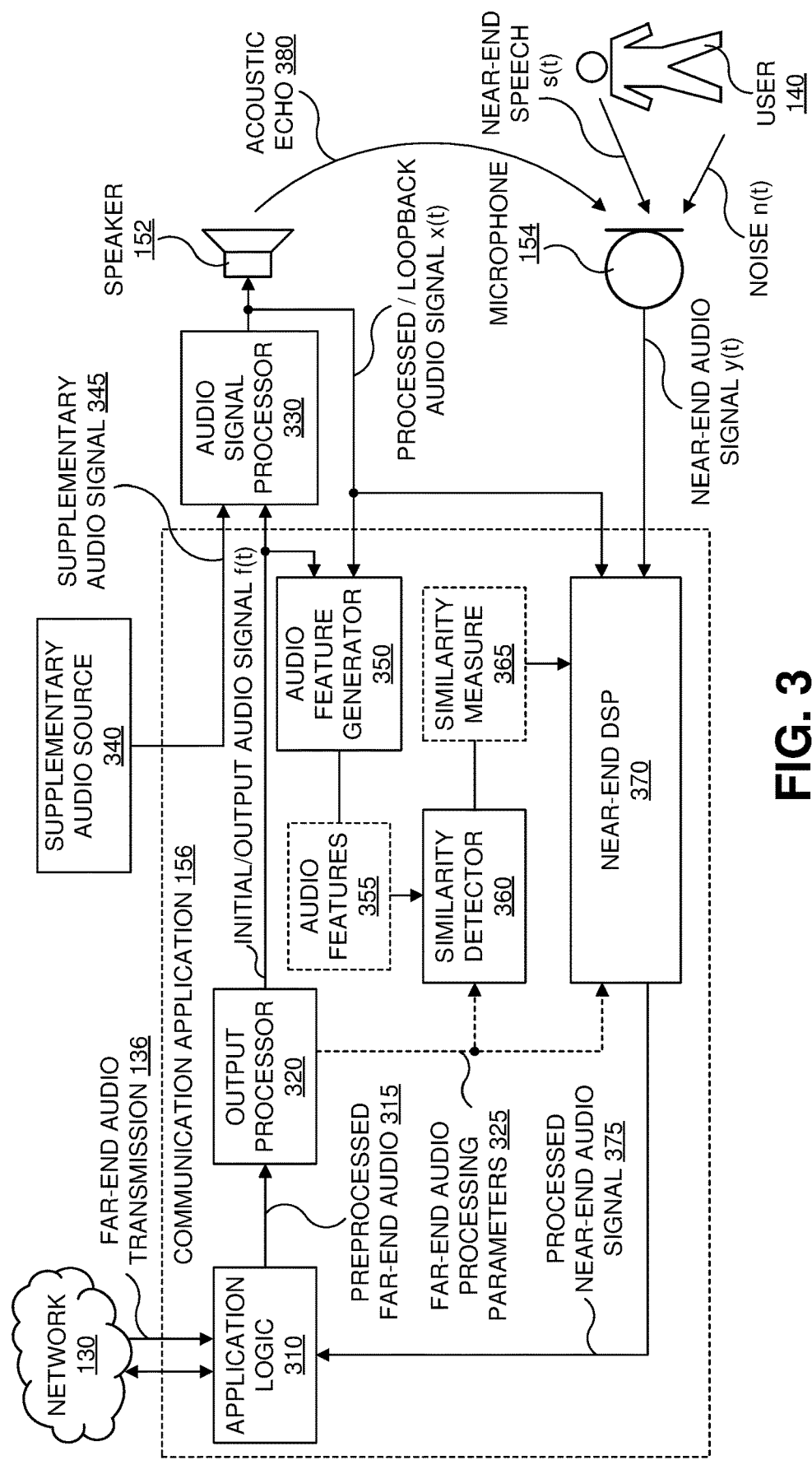
FIG. 3 is a schematic block diagram for improved adaptation control in response to problematic playout effects introduced by an audio signal processor.

FIG. 3 is a schematic block diagram for improved adaptation control in response to problematic playout effects introduced by an audio signal processor 330. FIG. 3 illustrates various features of the second user system 150 shown in FIG. 1 and its associated second user 140. As in FIG. 1, at the time shown in FIG. 3, the second user 140 is participating in a real-time audio communication session via the communication application 156 executing on the second user system 150. The communication application 156 includes application logic 310 providing various functionality for the communication application 156, including, but not limited to, providing a user interface, responding to user input actions, establishing and/or participating in real-time audio communication sessions, and exchanging data via communication network 130 with other systems participating in real-time communication sessions with the second user system 150. In this example, the application logic 310 generates, based on at least the far-end audio transmissions 136 received via the communication network 130 from another system participating in the current real-time audio communication session, a preprocessed far-end audio signal 315 (which may also be referred to as "preprocessed far-end audio").

In this example, the communication application 156 includes an output processor 320 configured to receive and process the preprocessed far-end audio signal 315 to generate an output audio signal f(t) for playout to the second user 140 via the speaker 152. The initial/output audio signal f(t) may also be referred to as an "initial audio signal," an "initial signal," an "output audio signal," a "rendered audio signal," a "rendered signal," a "far-end audio signal," or a "far-end signal." In some implementations, the preprocessed far-end audio signal 315 may be used as the initial/output audio signal f(t) without modification. Processing performed by the output processor 320 may include, for example, gain control, normalization, audio signal mixing (for example, mixing of multiple preprocessed far-end audio streams received from respective user systems participating in the communication session), voice activity detection, noise estimation, and/or smoothing.

The second user system 150 also includes an audio signal processor 330 which, as described in FIG. 1, is configured to receive the output audio signal f(t) and process the output audio signal f(t) in accordance with one or more playout effects before outputting the resulting processed/loopback audio signal x(t) via the speaker 152. In this way, the initial audio signal f(t) that has been processed by the audio signal processor 330 (and as a result, had one or more playout effects applied) is output to the second user 140 as part of the real-time audio communication session. Much as discussed in FIG. 1, in some examples, a supplementary audio source 340 executing on the second user system 150 (such as, but not limited to, a music player application, a web browser application, or an operating system component) may generate a supplementary audio signal 345 that is also provided to the audio signal processor 330 for playout. In such an example, the supplementary audio signal 345 is mixed with the initial audio signal f(t), and the mixed audio signal (not illustrated in FIG. 3) is processed to produce the processed/loopback audio signal x(t), resulting in playout of the supplementary audio signal along with the initial audio signal f(t). In some examples, there may be multiple supplementary audio sources 340 with respective supplementary audio signals 345. The processed/loopback audio signal x(t) is also provided as loopback audio signal x(t) to the communication application 156.

The microphone 154, which is located in acoustic proximity to the speaker 152, is used to capture and obtain a near-end audio signal y(t) capturing acoustic signals (i.e., sounds) received by the microphone 152. The near-end audio signal y(t) includes an acoustic echo 380 of the processed audio signal x(t) played out via the speaker 152 (such as direct, reflected, and reverberated sound waves) and noise n(t) (which may include, for example, background from the second location 145 in which the second user system 150 is being used and/or electronic noise). Additionally, during periods of time that the second user 140 is speaking, the near-end audio signal y(t) also includes near-end speech s(t) uttered by the second user 140.

The communication application 156 further includes a near-end digital signal processor (DSP) 370 (which may also be referred to as a "near-end audio signal processor"), which is configured to receive the near-end audio signal y(t) and perform one or more digital audio signal processing operations based at least on the near-end audio signal y(t) to generate and provide a processed near-end audio signal 375. For example, one or more of the operations performed by the near-end DSP 370 may perform echo cancellation and associated operations to remove an estimated echo component from the near-end audio signal y(t), providing an echo-removed near-end audio signal. The term "audio signal processing operation" may be applied to, for example, an operation that generates an audio signal, and an operation that characterizes one or more audio signals. In examples in which echo cancellation is performed, the processed near-end audio signal 375 may also be referred to as an "echo-removed near-end audio signal" or an "echo-removed audio signal." The processed near-end audio signal 375 is received and processed by the application logic 310. For example, the application logic 310 may be configured to, based on at least the processed near-end audio signal 375, generate and transmit one or more near-end audio transmissions 138 via the communication network 130 to one or more other user systems participating in the current real-time audio communication session.

In some implementations, as illustrated by the example shown in FIG. 3, the near-end DSP 370 is also configured to generate the processed near-end audio signal 375 based at least on the loopback audio signal x(t). In some implementations, the near-end DSP 370 may be configured to generate the processed near-end audio signal 375 also based at least on one or more far-end audio processing parameters 325 received from the output processor 320. The far-end audio processing parameters 325 indicate how the preprocessed far-end audio 315 was classified and/or processed by the output processor 320 for the initial output signal f(t). Example far-end audio processing parameters 325 include, but are not limited to, a classification of the initial output signal f(t) as voice or noise, and/or a smoothing coefficient. In some implementations, the similarity detector 360 may be configured to generate the similarity measure 365 also based at least on one or more of the far-end audio processing parameters 325. For example, one or more far-end audio processing parameters 325 may be useful in combination with one or more audio features 355. In some implementations, the audio feature generator 350 may be configured to generate the audio features 355 also based at least on one or more of the far-end audio processing parameters 325. For example, one or more far-end audio processing parameters 325 may be used to determine how and/or whether one or more audio features 355 are generated. The far-end audio processing parameters 325 provide additional information that allows more accurate estimation/determination of audio features 355 and/or similarity measure 360, and processing of the near-end audio signal y(t) based on characteristics of the initial output signal f(t) that may not be readily determined based on the loopback audio signal x(t).

To address issues arising from problematic playout effects introduced by the audio signal processor 330, such as the problems described in FIGS. 1 and 2, one or more of the digital audio signal processing operations performed by the near-end DSP 370 on the near-end audio signal y(t) are responsive to a similarity measure 365. The similarity measure 365 indicates, for a selected period of time, an estimated/determined similarity between the initial audio signal f(t) and a respective counterpart portion of the loopback audio signal x(t) based on at least a comparison of the audio signals f(t) and x(t) performed using an audio feature generator 350 and a similarity detector 360. In some implementations, the near-end DSP 370 may be configured to adjust an adaptation rate, or otherwise adjust an aggressiveness, of an audio signal processing operation (such as, but not limited to, changing a parameter of an auto-regressive smoother or a time constant, resulting in a respective change in an adaptation rate of the audio signal processing operation). In some examples, the near-end DSP 370 is configured to control, based on at least the adjusted adaptation rate, an echo cancellation process for cancelling an estimated echo from the near-end audio signal y(t).

To generate the similarity measure 365, the communication application 156 includes an audio feature generator 350, which is configured to receive the initial audio signal f(t) and the loopback audio signal x(t) and generate one or more audio features 355 for a selected period of time based on at least the audio signals f(t) and x(t). In some implementations, the audio feature generator 350 is configured to generate multiple different audio features 355, which allows for more robust estimation/determination of similarity between the audio signals f(t) and x(t) under various conditions. In some implementations, the audio features 355 include at least one "scale invariant" audio feature, which refers to an audio feature 355 with little or no sensitivity to gain changes (constant within a frame) applied to an audio signal. As one example, a zero-crossing rate of the initial audio signal f(t) or the loopback audio signal x(t) is a scale invariant audio feature, as is a difference between a zero-crossing rate of the initial audio signal f(t) and a zero-crossing rate of the loopback audio signal x(t). Scale invariant audio features offer features for detecting similarity of audio signals that are somewhat robust to scaling introduced by problematic playout effects. Example operations and features of the audio feature generator 350 are described in FIGS. 4A, 4B, and 8, as are examples of various audio features 355, including additional scale invariant audio features.

The audio features 355 are provided to the similarity detector 360, which is configured to receive the audio features 355 and generate the similarity measure 365 between the initial audio signal f(t) and the loopback audio signal x(t). In various implementations, the similarity measure 365 may be a single value or a include multiple component values (for example, as a vector, matrix, or array). Examples of component values that may be included in the similarity measure 365 include, but are not limited to, a binary indication of similarity (e.g., similar/not similar), a value within a range (for example, a confidence value of similarity within a range of zero to 1), and a classification of one or both of the input audio signal f(t) and the loopback audio signal x(t). In an implementation in which one or more scale invariant audio features are included in the audio features 355 and used by the similarity detector 360 to generate the similarity measure 365, the resulting similarity measure 365 may be referred to as "scale invariant." The similarity detector 360 may be configured to process the audio features 355 according to a heuristic method (such as according to a human-developed algorithm), by use of a machine-trained model that operates on the audio features 355 as inputs, or a hybrid of the two. Example operations and features of the similarity detector 360 are described in FIG. 5.

Operations performed by the audio feature generator 350, the similarity detector 360, and/or the near-end DSP 370 on respective audio signals may be done according to audio frames of audio signals. An "audio frame" may also be referred to simply as a "frame." Each frame corresponds to a selected period of time, and in some examples, there may be overlap between successive frames. Frame sizes ranging from 5 ms to 20 ms are commonly used, although other frames sizes may be used. For example, a series of near-end audio frames may be generated from the near-end audio signal y(t), and for each near-end audio frame new audio features 355 and a new similarity measure 365 are generated, which in turn affect one or more audio signal processing operations performed by the near-end DSP 370.

Figure 4A:
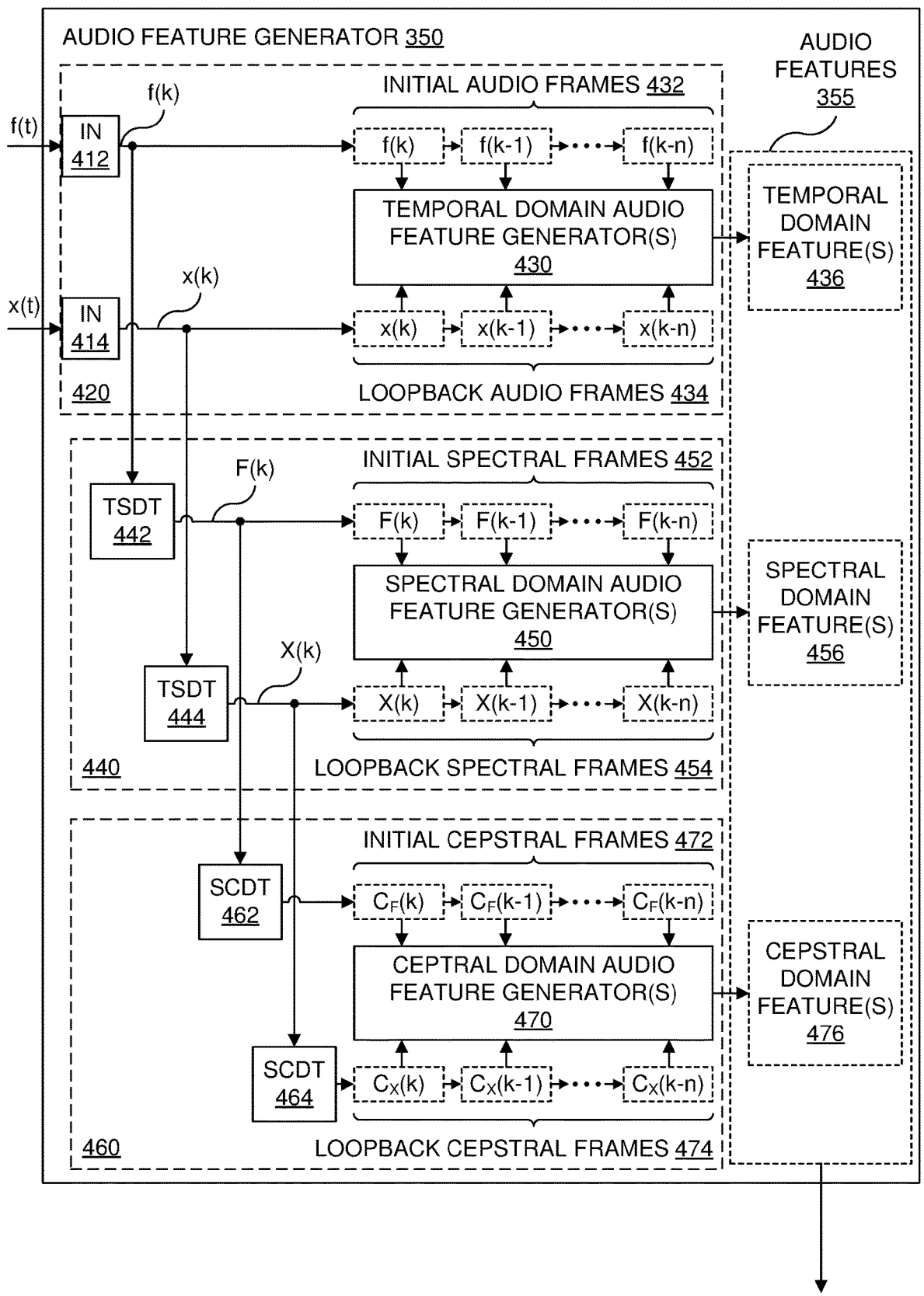
FIG. 4A is a schematic block diagram presenting an example and describing further aspects of the audio feature generator described in FIG. 3.

FIG. 4A is a schematic block diagram presenting an example and describing further aspects of the audio feature generator 350 described in FIG. 3. As described above, the audio feature generator 350 generates the audio features 355 from the initial audio signal f(t) and the loopback audio signal x(t) for use in estimating/determining a similarity between the initial audio signal f(t) and the loopback audio signal x(t). In various implementations, the audio feature generator 350 may (or may not) include one or more temporal domain feature blocks 420 configured to generate temporal domain audio features 436, may (or may not) include one or more spectral domain feature blocks 440 that generate spectral domain audio features 456, and may (or may not) include one or more cepstral domain feature blocks 460 that generate cepstral domain audio features 476.

In the example shown in FIG. 4A, the audio feature generator 350 operates on the received audio signals f(t) and x(t) as frames f(k) and x(k) and generates new audio features 355 for each frame k. The illustrated temporal domain feature block 420 includes a first input block 412 configured to produce a series of initial audio frames f(k) from the initial audio signal f(t). The illustrated temporal domain feature block 420 also includes a second input block 414 configured to produce a series of loopback audio frames x(k) from the loopback audio signal x(t) in the same manner as the first input block 412 (in other words, with frames of the same sizes and overlap). The index "k" identifies a period of time for a frame, with "k" referring to a current frame, "k−1" referring to the frame immediately preceding the current frame, and so on. An audio frame can also be referred to as a "temporal frame."

In some implementations, due to delay between providing a portion of the initial audio signal f(t) to the audio signal processor 330 and obtaining the counterpart portion of the loopback audio signal x(t), the audio feature generator 350 may be configured to temporally align the audio signals f(t) and x(t) (for example, by delaying or buffering the initial audio signal f(t) until the counterpart portion of the loopback audio signal x(t) is obtained) to obtain temporally aligned audio frames f(k) and x(k) that both span the same period of time. In some examples, the initial audio signal f(t) and/or the loopback audio signal x(t) are temporally aligned with respect to counterpart near-end audio frames y(k) (not illustrated in the figures) generated from the near-end audio signal y(t) and processed by the near-end DSP 370. In some implementations, the first input block 412 and/or the second input block 414 may be configured to normalize their respective audio signals. In some implementations, the audio feature generator 350 may include multiple temporal domain feature blocks 420, which each generate frames differently (for example, frames of different sizes). In some implementations, frame-based processing of the output audio signal f(t) and/or the loopback audio signal x(t) by other portions of the communication application 156 allows the audio frames f(k) and/or x(k) to also be used by those portions. In some implementations, the first input block 412 and/or the second input block 414 may be provided outside of the audio feature generator 350 in connection with use of audio frames f(k) and/or x(k) by other portions of the communication application 156.

The illustrated temporal domain feature block 420 includes at least one temporal domain audio feature generator 430, which is configured to generate, for each frame k, one or more temporal domain audio feature(s) 436 based on at least the current initial audio frame f(k) and/or the current loopback audio frame x(k). A temporal domain feature block 420 may include multiple temporal domain audio feature generators 430. In some examples, a temporal domain audio feature generator 430 is configured to generate one or more temporal domain audio features 436 based on at least multiple initial audio frames 432 (including the current frame f(k) and/or one or more past frames f(k−1) to f(k−n)) and/or multiple loopback audio frames 434 (including the current frame and/or one or more past frames f(k−1) to f(k−n)). Example types of temporal domain audio features 436 include, but are not limited to, zero crossing rate, mean crossing rate, time domain envelope, temporal centroid, temporal asymmetry, temporal flatness, RMS amplitude, autocorrelation coefficients, cross-correlation coefficients, first and/or second derivatives of a temporal feature.

The illustrated spectral domain feature block 440 includes a first temporal-to-spectral domain transformer (TSDT) 442 configured to transform the current initial audio frame f(k) to a spectral domain to generate a current initial spectral frame F(k) for the initial audio signal f(t), and a second temporal-to-spectral domain transformer (TSDT) 444 configured to transform the current loopback audio frame x(k) to the same spectral domain to generate a current loopback spectral frame X(k) for the loopback audio signal x(t). Example spectral domains include, but are not limited to, Discrete Fourier Transform (DFT), Discrete Cosine Transform (DCT), and Discrete Wavelet Transform (DWT). In some implementations, the audio feature generator 350 may include multiple spectral domain feature blocks 440, with different spectral domains and/or differently generated frames (for example, frames of different sizes to make various time/frequency tradeoffs). In some implementations, frame-based processing of the output audio signal f(t) and/or the loopback audio signal x(t) by other portions of the communication application 156 allows the spectral frames F(k) and/or X(k) to also be used by those portions. In some implementations, the first TSDT 442 and/or the second TSDT 444 may be provided outside of the audio feature generator 350 in connection with use of spectral frames F(k) and/or X(k) by other portions of the communication application 156.

The illustrated spectral domain feature block 440 includes at least one spectral domain audio feature generator 450, which is configured to generate, for each frame k, one or more spectral domain audio feature(s) 456 based on at least the current initial spectral frame F(k) and/or the current loopback spectral frame X(k). A spectral domain feature block 440 may include multiple spectral domain audio feature generators 450. In some examples, a spectral domain audio feature generator 450 is configured to generate one or more spectral domain audio features 456 based on at least multiple initial spectral frames 452 (including the current frame F(k) and/or one or more past frames F(k−1) to F(k−n)) and/or multiple loopback spectral frames 454 (including the current frame F(k) and/or one or more past frames F(k−1) to F(k−n)). Example types of spectral domain audio features 456 include, but are not limited to, DCT coefficients, spectral tilt, spectral slope, spectral crest factor, spectral flatness, spectral entropy, spectral rolloff, spectral flux, spectral sharpness, spectral dispersion, spectral smoothness, spectral moments (spectral spread/variance, spectral standard deviation, spectral skewness, and/or spectral kurtosis), spectral envelope, spectral difference (successive frames or between F(k) and X(k)), MPEG-7 audio spectrum basis/projection, energy (including RMS energy and log energy), such features for selected subbands, intensity/energy ratios of subbands (for example, Hammarberg Index or Alpha Ratio), and first and/or second derivatives of a spectral feature. In some examples, a spectral domain feature may be generated based on one or more normalized audio frames to reduce gain-related effects on spectral features.

The illustrated cepstral domain feature block 460 includes a first spectral-to-cepstral domain transformer (SCDT) 462 configured to transform an initial spectral frame F(k) to a cepstral domain to generate a current initial cepstral frame $C_F(k)$ for the initial audio signal f(t), and a second spectral-to-cepstral domain transformer (SCDT) 464 configured to transform a loopback spectral frame X(k) to the same cepstral domain to generate a current loopback cepstral frame $C_X(k)$ for the loopback audio signal x(t). In some implementations, the audio feature generator 350 may include multiple cepstral domain feature blocks 460, with different cepstral domains and/or differently generated frames (for example, frames of different sizes). In some implementations, frame-based processing of the output audio signal f(t) and/or the loopback audio signal x(t) by other portions of the communication application 156 allows the cepstral frames $C_F(k)$ and/or $C_X(k)$ to also be used by those portions. In some implementations, the first SCDT 462 and/or the second SCDT 464 may be provided outside of the audio feature generator 350 in connection with use of cepstral frames $C_F(k)$ and/or $C_X(k)$ by other portions of the communication application 156.

The illustrated cepstral domain feature block 460 includes at least one cepstral domain audio feature generator 470, which is configured to generate, for each frame k, one or more cepstral domain audio feature(s) 476 based on at least the current initial cepstral frame $C_F(k)$ and/or the current loopback cepstral frame $C_X(k)$. A cepstral domain feature block 460 may include multiple cepstral domain audio feature generators 470. In some examples, a cepstral domain audio feature generator 470 is configured to generate one or more cepstral domain audio feature(s) 476 based on at least multiple initial cepstral frames 472 (including the current frame $C_F(k)$ and/or one or more past frames $C_F(k-1)$ to $C_F(k-n)$) and/or multiple loopback cepstral frames 474 (including the current frame $C_F(k)$ and/or one or more past frames $C_F(k-1)$ to $C_F(k-n)$). Example types of cepstral domain audio features 476 include, but are not limited to, Mel-Frequency Cepstral Coefficients (MFCC) and/or their derivatives (ΔMFCC and/or ΔΔMFCC), autocorrelation MFCCs, Bark-Frequency Cepstral Coefficients (BFCC) and/or their derivatives, Homomorphic Cepstral Coefficients. In some examples, a cepstral domain feature may be generated based on one or more normalized audio frames to reduce gain-related offsets in a cepstral domain.

Figure 4B:
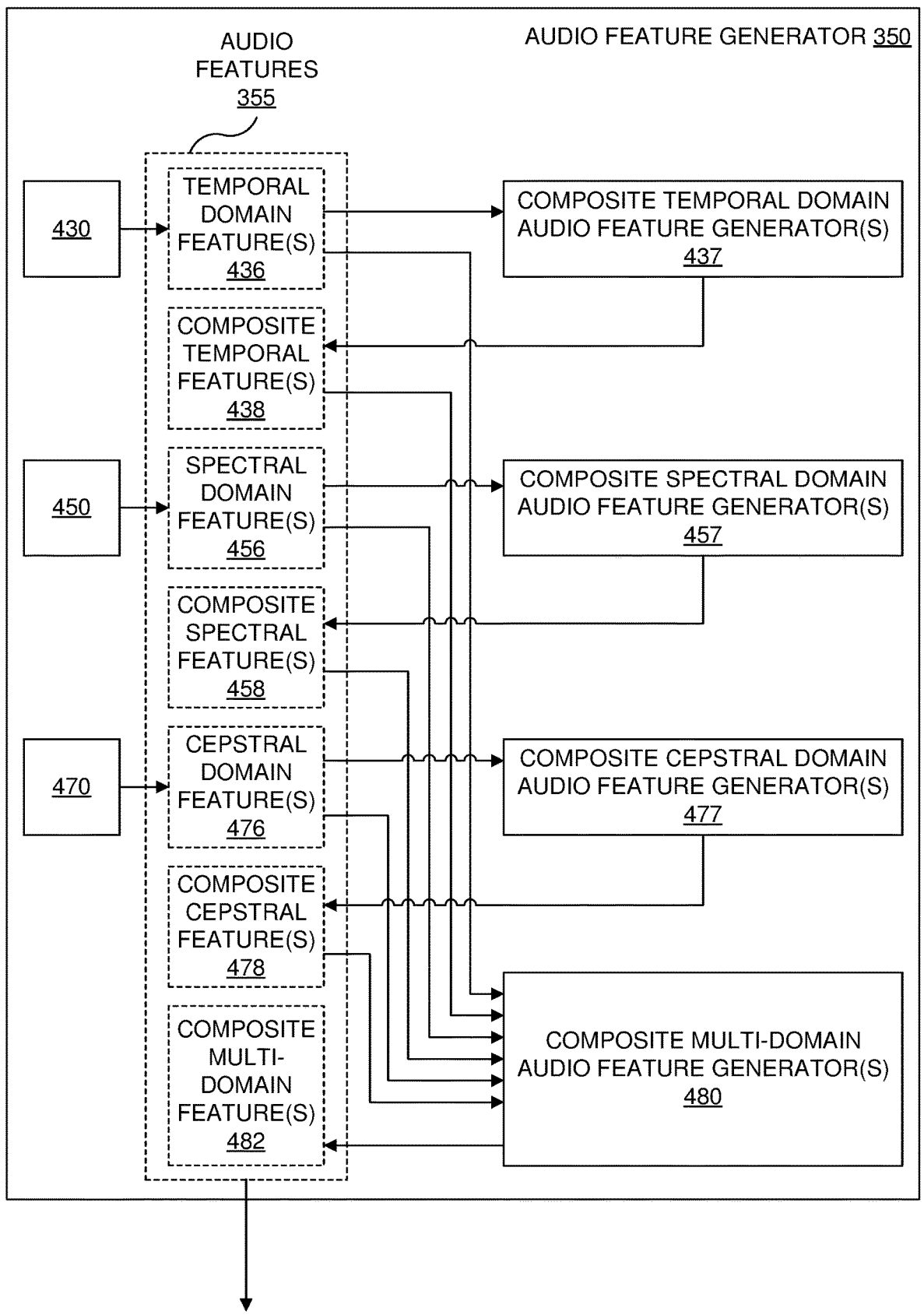
FIG. 4B is a schematic block diagram presenting an example and describing further aspects of the audio feature generator described in FIGS. 3 and 4A.

FIG. 4B is a schematic block diagram presenting an example and describing further aspects of the audio feature generator 350 described in FIGS. 3 and 4A. In various implementations, the audio feature generator 350 may (or may not) include one or more composite temporal domain audio feature generators 437 that generate composite temporal domain audio features 438, may (or may not) include one or more composite spectral domain audio feature generators 457 that generate composite spectral domain audio features 458, may (or may not) include one or more composite cepstral domain audio feature generators 477 that generate composite cepstral domain audio features 478, and may (or may not) include one or more composite multi-domain audio feature generators 480 that generate composite multi-domain audio features 482.

In many examples, composite audio features provide useful comparisons between the initial audio signal f(t) and the loopback audio signal x(t) for the similarity detector 360 to estimate/determine a similarity of the audio signals f(t) and x(t). For example, a composite audio feature may be generated based on a normalized cross-correlation coefficient, a difference/distance, or other comparison between a first audio feature of a selected type (for example, spectral tilt) generated for the initial audio signal f(t) and a second audio feature of the same selected type generated for the loopback audio signal x(t). Where, for example, a difference/distance between the first and second audio features for a composite audio feature is small, the composite audio feature suggests that the initial audio signal f(t) and the loopback audio signal x(t) are similar.

The composite temporal domain audio feature generators 437 are each configured to generate, for the current frame, one or more composite temporal domain audio features 438 each based on two or more temporal domain audio features 436 generated for the current frame. For example, a composite temporal audio feature 438 may be generated based on a temporal domain audio feature 436 of a selected type generated for the initial audio signal f(t) and a temporal domain audio feature 436 of the same selected type generated for the loopback audio signal x(t). In some implementations, a composite temporal domain audio feature generator 437 may be included in a temporal domain audio feature generator 430. The composite temporal audio feature(s) 438 may be considered part of the temporal domain audio feature(s) 436.

The composite spectral domain audio feature generators 457 are each configured to generate, for the current frame, one or more composite spectral domain audio features 458 each based on two or more spectral domain audio features 456 generated for the current frame. For example, a composite spectral feature 458 may be generated based on a spectral domain audio feature 456 of a selected type generated for the initial audio signal f(t) and a spectral domain audio feature 456 of the same selected type generated for the loopback audio signal x(t). In some implementations, a composite spectral domain audio feature generator 457 may be included in a spectral domain audio feature generator 450. The composite spectral audio feature(s) 458 may be considered part of the spectral domain audio feature(s) 456.

The composite cepstral domain audio feature generators 477 are each configured to generate, for the current frame, one or more composite cepstral domain audio features 478 each based on two or more cepstral domain audio features 476 generated for the current frame. For example, a composite cepstral feature 478 may be generated based on a cepstral domain audio feature 476 of a selected type generated for the initial audio signal f(t) and a cepstral domain audio feature 476 of the same selected type generated for the loopback audio signal x(t). In some implementations, a composite cepstral domain audio feature generator 477 may be included in a cepstral domain audio feature generator 470. The composite cepstral audio feature(s) 478 may be considered part of the cepstral domain audio feature(s) 476.

The composite multi-domain audio feature generators 480 are each configured to generate, for the current frame, one or more composite multi-domain audio features 482 each based on two or more audio features 436, 438, 456, 458, 476, and/or 478, in which the audio features are for at least two different domains. For example, a composite multi-domain audio feature 482 might be generated by multiplying one or more components of a composite temporal domain audio feature 438 with one or more components of a composite spectral domain audio feature 458.

Examples of composite scale invariant audio features may be provided by a difference/distance or other comparison between a scale invariant audio feature of a selected type generated for the initial audio signal f(t) and a scale invariant audio feature of the same selected type generated for the loopback audio signal x(t). Examples of audio features that are only scaled when applying a gain to a time domain signal include, but are not limited to, magnitude spectra and complex Fourier coefficients. Other examples of composite scale invariant features may be provided by one or more normalized cross-correlation coefficients between an audio feature of a selected type generated for the initial audio signal f(t) and an audio feature of the same selected type generated for the loopback audio signal x(t), where the selected type of audio feature is only scaled when applying a gain to a time domain signal. Examples of scale invariant audio features include the zero-crossing rate, crest factor, and spectral tilt.

Figure 5:
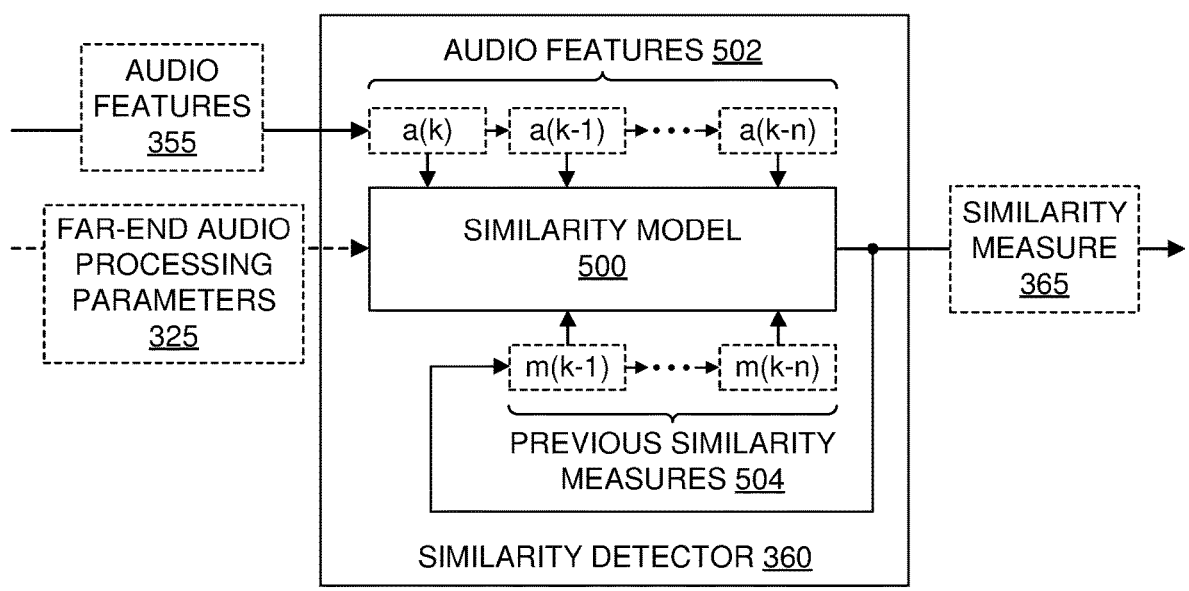
FIG. 5 illustrates an example and describes further aspects of the similarity detector described in FIG. 3.

FIG. 5 illustrates an example and describes further aspects of the similarity detector 360 described in FIG. 3. In the example shown in FIG. 5, the similarity detector 360 is configured to apply at least one similarity model 500 to generate the similarity measure 365 based on at least the audio features 355 for the current frame k (labeled "a(k)") as an input. In some implementations, the similarity model 500 is configured to receive, and generate the similarity measure 365 based on at least, audio features 502 from multiple frames (including one or more past frames k−1 to k−n and respective audio features a(k−1) to a(k−n)) as inputs. In some implementations, the similarity model 500 is configured to receive, and generate the similarity measure 365 based on at least, previous similarity measures 504 generated for one or more previous frames (including one or more past frames k−1 to k−n and respective similarity measures m(k−1) to m(k−n)) as inputs. For example, the similarity model 500 may, in some circumstances, be biased toward maintaining a previous similarity measure. In some implementations, the similarity model 500 is configured to receive, and generate the similarity measure 365 based on at least, the far-end audio processing parameters 325. Much as noted previously, the similarity model 500 may be implemented using a heuristic model, a machine-trained model (for use with one or more associated machine learning (ML) algorithms), and/or a hybrid of the two. Once trained effectively, a machine-trained model can offer accuracy and a low computational cost. Additionally, in the process of training models, assessments can be made as to tradeoffs between the computational costs of calculating specific audio features against the accuracy provided by the features.

Figure 6:
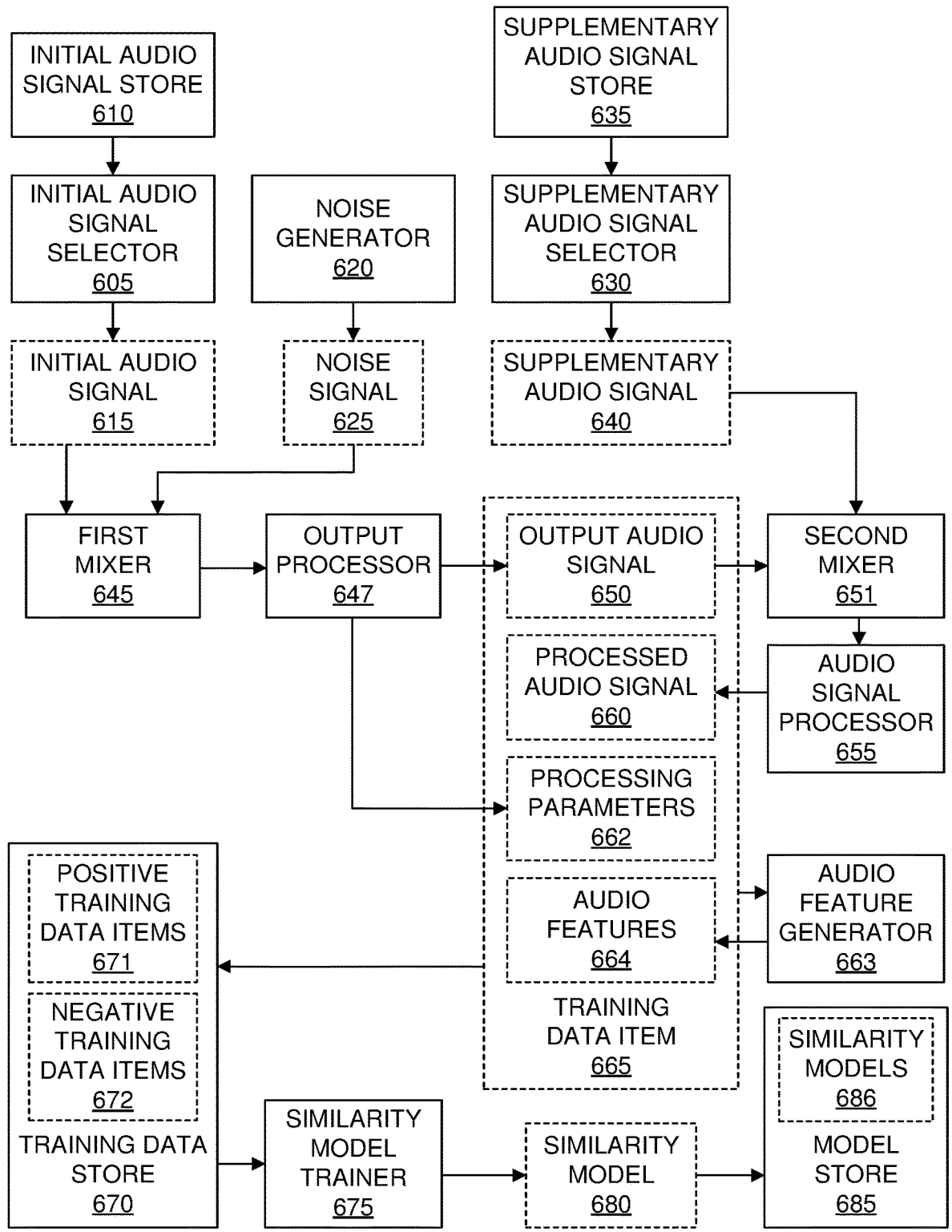
FIG. 6 illustrates an example model training system for generating machine-trained similarity models suitable for use with the similarity detector described in FIGS. 3 and 5.

In an implementation of the similarity detector 360 using a machine-trained model, there are various ML algorithms for which the machine-trained model may be trained, including, but not limited to, use of Linear Discriminant Analysis (LDA), Support Vector Machine (SVM), decision trees, random decision forests, deep neural networks (DNN), convolutional neural networks (CNN), recurrent neural networks (RNN), and Gaussian Mixture Model (GMM). FIG. 6 illustrates an example model training system 600 for generating machine-trained similarity models suitable for use with the similarity detector 360 described in FIGS. 3 and 5. The model training system 600 may be utilized to automatically generate a substantial training data set of both positive and negative training data items.

The model training system 600 includes an initial audio signal selector 605, configured to generate an initial audio signal 615 based on sample audio signals recorded in an initial audio signal store 610 (in some implementations, selected compression-related artifacts may be introduced); a noise generator 620 configured to generate a noise signal 625 with selected characteristics; and a supplementary audio signal selector 630 configured to generate a supplementary audio signal 640 based on sample audio signals recorded in a supplementary audio signal store 635. Selected amounts of delay may be added to the initial audio signal 615 and/or the supplementary audio signal 640. For generating an output audio signal 650 for a training data item 665, the initial audio signal 615 and the noise signal 625 may be combined (at selectable levels) using a first mixer 645. In some implementations, such as in the example shown in FIG. 6, a first mixed audio signal generated by the first mixer 645 is received by an output processor 647, which is configured to process the first mixed audio signal, much as described for the output processor 320 in FIG. 3, to generate the output audio signal 650. In some implementations, the output processor 647 generates processing parameters 662, as described in connection with the far-end processing parameters 325 in FIG. 3, which are included with the output audio signal 650 in the training data item 665.

A second mixer 651 is configured to mix the supplementary audio signal 640 with the output audio signal 650 (at selectable levels) to generate a second mixed audio signal, which is supplied to the audio signal processor 655 to generate a processed audio signal 660 counterpart to the initial audio signal 650. The audio signal processor 655 is configured to apply one or more selected various playout effects. The processed audio signal 660 is also included in the training data item 665, which is recorded in a training data store 670. The model training system 600 includes an audio feature generator 663 configured to generate audio features 664 based at least on the output audio signal 650 and processed audio signal 660, as described for the audio feature generator 350 and audio features 355 in FIGS. 3, 4A, and 4B. The audio features 664 are included in the training data item 665. The resulting training data item 665 then includes the output audio signal 650 (providing a synthetic initial audio signal f(t)), the processed audio signal 660 (providing a synthetic loopback audio signal x(t)), the processing parameters 662 (providing a synthetic set of far-end processing parameters), and corresponding audio features 664. For generating positive training data items 671 (which a trained model is intended to identify as being similar), the supplementary audio signal 640 is excluded or mixed at a low level. For generating negative training data items 672 (which a trained model is intended to identify as being dissimilar), the supplementary audio signal 640 is included. The training data item 665 may further include item creation parameters (not shown in FIG. 6) describing parameters provided to initial signal selector 605, noise generator 620, supplementary audio selector 630, first mixer 645, output processor 647, second mixer 651, audio signal processor 655, and/or audio feature generator 663 to generate the training data item 665. In some examples, the output audio signal 650 and the processed signal 660 are not recorded in the training data store 670.

The training data store 670 provides a corpus of training data items for training, testing, and evaluating machine-trained similarity models 680 (which may be referred to as "machine-trained models," "machine learning models," or "ML models"). A similarity model trainer 675 (which may be referred to as a "training system") is configured to obtain training data items from the training data store 670 which are then used to automatically produce a machine-trained similarity model 680, which may be recorded in a model store 685 along with other similarity models 686. The similarity model trainer 675 may include and/or have access to substantial computation resources for training, such as a cloud, including many computer server systems adapted for machine learning training. In some implementations, the similarity model trainer 675 is configured to automatically generate multiple different machine-trained models from the same or similar training data for comparison. For example, different underlying ML algorithms may be trained. As another example, a size or complexity of a model may be varied between different ML models, such as a maximum depth for decision trees, or a number, size, and/or arrangement of hidden layers in a neural network. As another example, different training approaches may be used for training different ML models, such as, but not limited to, selection of training, validation, and test sets of training data, ordering and/or weighting of training data items, or numbers of training iterations. One or more of the resulting multiple machine-trained similarity models 680 may be selected based on factors such as, but not limited to, accuracy, computational efficiency, and/or power efficiency. In some implementations, a single machine-trained similarity model 680 may be produced.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), and 2017/0262768 (published on Sep. 14, 2017 and entitled "Depth from Time-of-Flight Using Machine Learning"), and U.S. patent application Ser. No. 15/870,783 (filed on Jan. 12, 2018 and entitled "Automated Collection of Machine Learning Data"), which are each incorporated by reference herein in their entireties.

Figure 7:
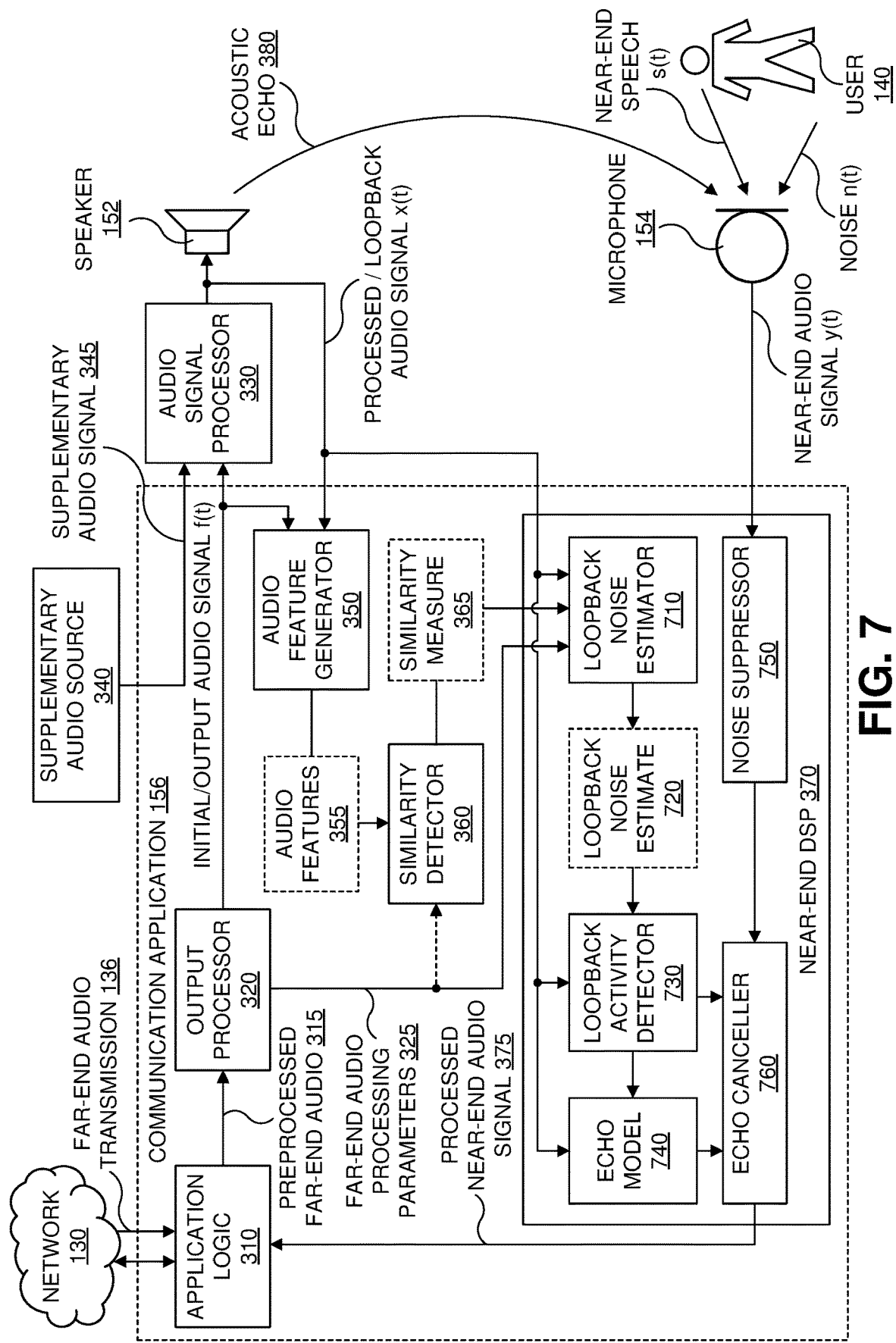
FIG. 7 is a schematic block diagram for echo cancellation with improved adaptation control in response to problematic playout effects introduced by an audio signal processor.

FIG. 7 is a schematic block diagram for echo cancellation with improved adaptation control in response to problematic playout effects introduced by an audio signal processor 330. Many of the illustrated features are discussed in connection with FIGS. 3-5. In this example, the near-end DSP 370 performs a number of audio signal processing operations, including one or more operations performed by a loopback noise estimator 710 (which is configured to perform loopback audio signal noise estimation to generate a loopback noise estimate 720 based on at least the loopback signal x(t), similarity measure 365, and far-end audio processing parameters 325), one or more operations performed by a loopback activity detector 730 (which is configured to classify activity, such as activity due to voice activity from the initial signal f(t) and/or other activity from the active supplementary audio signal 345 of the loopback audio signal x(t)), one or more operations performed by an echo model generator 740 (which is configured to generate an estimated model of the acoustic echo 380), one or more operations performed by a noise suppressor 750 (which is configured to estimate and suppress a noise component of the near-end audio signal y(t)), and one or more operations performed by an echo canceller 760 (which is configured to suppress an estimated echo component of the near-end audio signal y(t)).

In this example, one or more audio signal processing operations performed by the loopback activity noise estimator 710 are responsive to the similarity measure 365. Specifically, in response to a similarity measure 365 indicating that the initial audio signal f(t) and the loopback audio signal x(t) are similar, the loopback activity noise estimator 710 increases its adaptation rate, allowing it to more quickly adapt to sudden increases in gain resulting from problematic playout effects introduced by the audio signal processor 330. In some implementations, the loopback activity noise estimator 710 is configured to increase its adaptation speed only if also the loopback audio signal x(t) is above the current loopback noise estimate 720.

Figure 8:
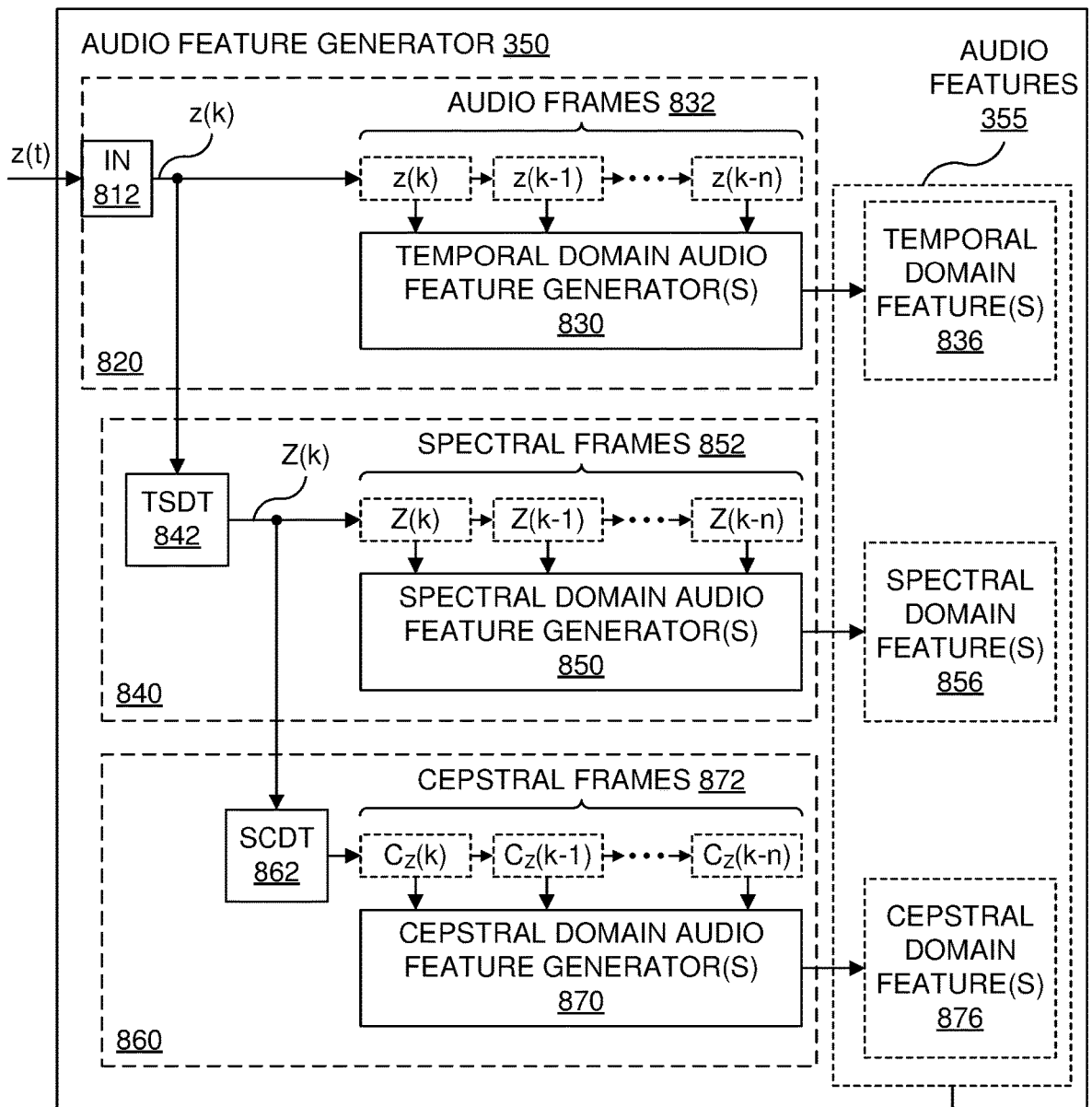
FIG. 8 illustrates an example of additional aspects which may be incorporated into the audio feature generator described in FIGS. 3, 4A, and 4B.

FIG. 8 illustrates an example of additional aspects which may be incorporated into the audio feature generator 350 described in FIGS. 3, 4A, and 4B. The processing shown in FIG. 8 is similar to the processing in FIG. 4A, except that the audio features 355 are generated based on only a single audio signal z(t), in contrast to the two audio signals f(t) and x(t) used in FIG. 4A. In some examples, the audio signal z(t) is the loopback audio signal x(t). In various implementations, the audio feature generator 350 may (or may not) include one or more temporal domain feature blocks 820 configured to generate temporal domain audio features 836, may (or may not) include one or more spectral domain feature blocks 840 that generate spectral domain audio features 856, and may (or may not) include one or more cepstral domain feature blocks 860 that generate cepstral domain audio features 876.

The illustrated temporal domain feature block 820 includes an input block 812 configured to produce a series of audio frames z(k) from the audio signal z(t), as described for the first input block 412 in FIG. 4A. The illustrated temporal domain feature block 820 includes at least one temporal domain audio feature generator 830, which is configured to generate, for each frame k, one or more temporal domain audio feature(s) 836 based on at least the current audio frame z(k). In some examples, a temporal domain audio feature generator 830 is configured to generate one or more temporal domain audio feature(s) 836 based on at least multiple audio frames 832 (including the current frame f(k) and/or one or more past frames f(k−1) to f(k−n)). For example, multiple audio frames 832 may be processed to compare differences for a selected type of temporal domain audio feature to generate a temporal domain audio feature 836.

The illustrated spectral domain feature block 840 includes a TSDT 842 configured to transform the current audio frame z(k) to a spectral domain to generate a current spectral frame Z(k) for the audio signal z(t), as described for the first TSDT 442 in FIG. 4A. The illustrated spectral domain feature block 840 includes at least one spectral domain audio feature generator 850, which is configured to generate, for each frame k, one or more spectral domain audio feature(s) 856 based on at least the current spectral frame Z(k). In some examples, a spectral domain audio feature generator 850 is configured to generate one or more spectral domain audio feature(s) 856 based on at least multiple spectral frames 852 (including the current frame f(k) and/or one or more past frames f(k−1) to f(k−n)). For example, multiple spectral frames 852 may be processed to compare differences for a selected type of spectral domain audio feature to generate a spectral domain audio feature 856.

The illustrated cepstral domain feature block 860 includes an SCDT 862 configured to transform a spectral frame Z(k) to a cepstral domain to generate a cepstral frame $C_Z(k)$ for the audio signal z(t), as described for the first SCDT 462 in FIG. 4A. The illustrated cepstral domain feature block 860 includes at least one cepstral domain audio feature generator 870, which is configured to generate, for each frame k, one or more cepstral domain audio feature(s) 876 based on at least the current cepstral frame $C_Z(k)$. In some examples, a cepstral domain audio feature generator 870 is configured to generate one or more cepstral domain audio feature(s) 876 based on at least multiple cepstral frames 872 (including the current frame f(k) and/or one or more past frames f(k−1) to f(k−n)). For example, multiple cepstral frames 872 may be processed to compare differences for a selected type of cepstral domain audio feature to generate a cepstral domain audio feature 876.

In addition and/or in combination with the techniques described above, various techniques and systems for real-time audio communication and associated audio signal processing are described in U.S. Patent Application Publication Numbers 2008/0201137 (entitled "Method of estimating noise levels in a communication system" and published on Aug. 21, 2008), 2009/0185515 (entitled "Communication system" and published on Jul. 23, 2009), 2009/0185674 (entitled "Communication system" and published on Jul. 23, 2009), 2011/0112668 (entitled "Gain control for an audio signal" and published on May 12, 2011), 2011/0112831

(entitled "Noise suppression" and published on May 12, 2011), 2012/0163612 (entitled "Communication system" and published on Jun. 28, 2012), 2012/0207327 (entitled "Processing Audio Signals" and published on Aug. 16, 2012), 2012/0295562 (entitled "Processing Audio Signals" and published on Nov. 22, 2012), 2012/0303363 (entitled "Processing Audio Signals" and published on Nov. 29, 2012), 2013/0013403 (entitled "Processing Audio Signals" and published on Jan. 10, 2013), 2013/0129100 (entitled "Processing Audio Signals" and published on May 23, 2013), 2013/0230086 (entitled "Delay Estimation" and published on Sep. 5, 2013), 2014/0177822 (entitled "Echo Suppression" and published on Jun. 26, 2014), 2014/0324420 (entitled "Noise Suppression" and published on Oct. 30, 2014), 2014/0334631 (entitled "Noise Reduction" and published on Nov. 13, 2014), 2014/0365752 (entitled "Echo Cancellation" and published on Dec. 4, 2014), 2015/0154977 (entitled "Detecting Nonlinear Amplitude Processing" and published on Jun. 4, 2015), 2015/0222988 (entitled "Audio Signal Processing" and published on Aug. 6, 2015), and 2017/0103774 (entitled "Audio Signal Processing" and published on Apr. 13, 2017), which are each incorporated by reference herein in their entireties.

The detailed examples of systems, devices, and techniques described in connection with FIGS. 1-8 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a communication network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 9:
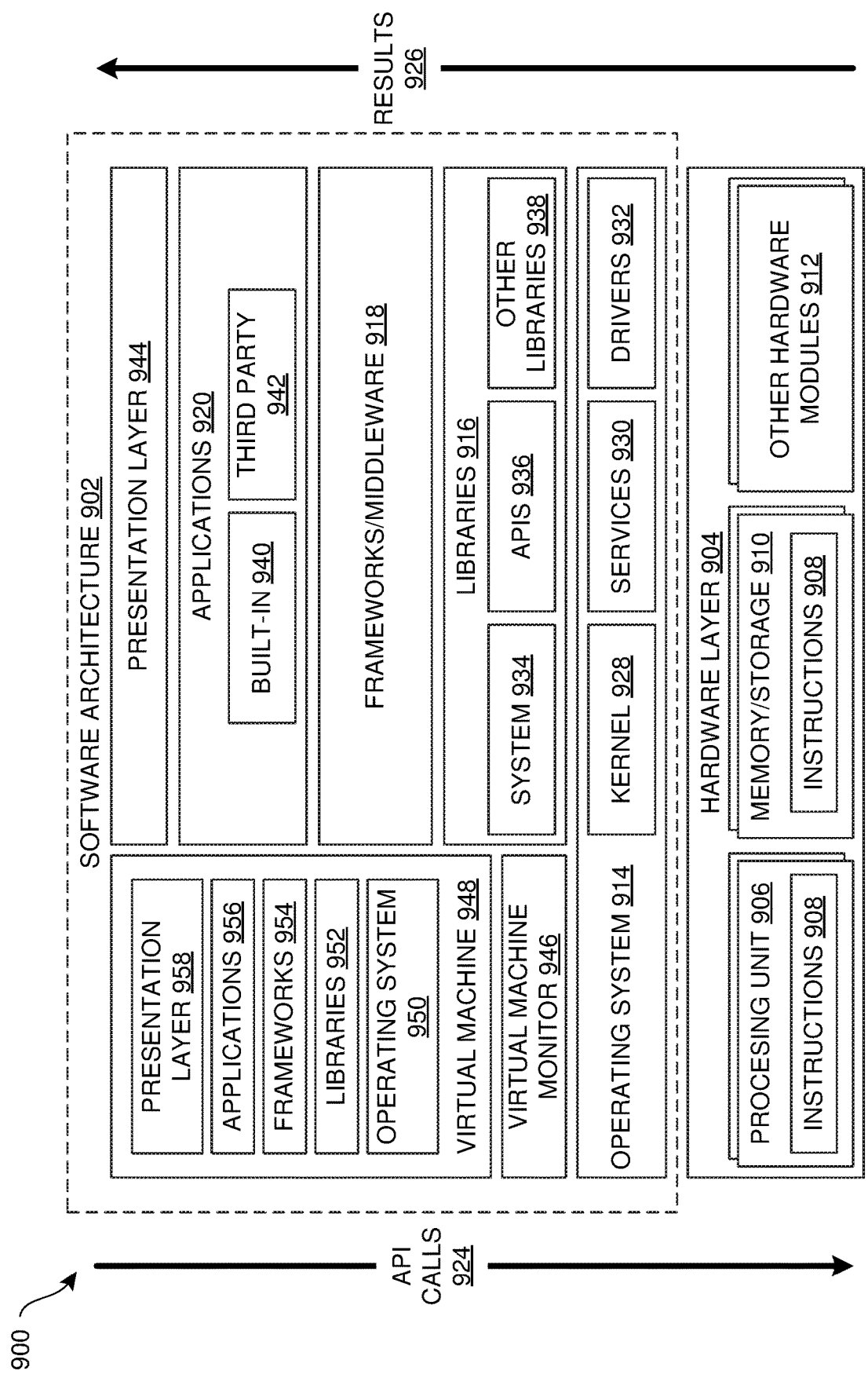
FIG. 9 is a block diagram illustrating an example software architecture, various portions of which may be used in conjunction with various hardware architectures herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as user systems 120 and 150 in FIGS. 1, 3-5, 7, and 8 and model training system 600 in FIG. 6. A representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 924. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 920 and/or third-party applications 922. Examples of built-in applications 920 may include, but are not limited to, a contacts application, a browser application, a location application, a media application, a messaging application, and/or a game application. Third-party applications 922 may include any applications developed by an entity other than the vendor of the particular platform. The applications 920 may use functions available via OS 914, libraries 916, frameworks 918, and presentation layer 924 to create user interfaces to interact with users.

Some software architectures use virtual machines, as illustrated by a virtual machine 928. The virtual machine 928 provides an execution environment where applications/modules can execute as if they were executing on a hardware machine (such as the machine 1000 of FIG. 10, for example). The virtual machine 928 may be hosted by a host OS (for example, OS 914) or hypervisor, and may have a virtual machine monitor 926 which manages operation of the virtual machine 928 and interoperation with the host operating system. A software architecture, which may be different from software architecture 902 outside of the virtual machine, executes within the virtual machine 928 such as an OS 950, libraries 952, frameworks 954, applications 956, and/or a presentation layer 958.

Figure 10:
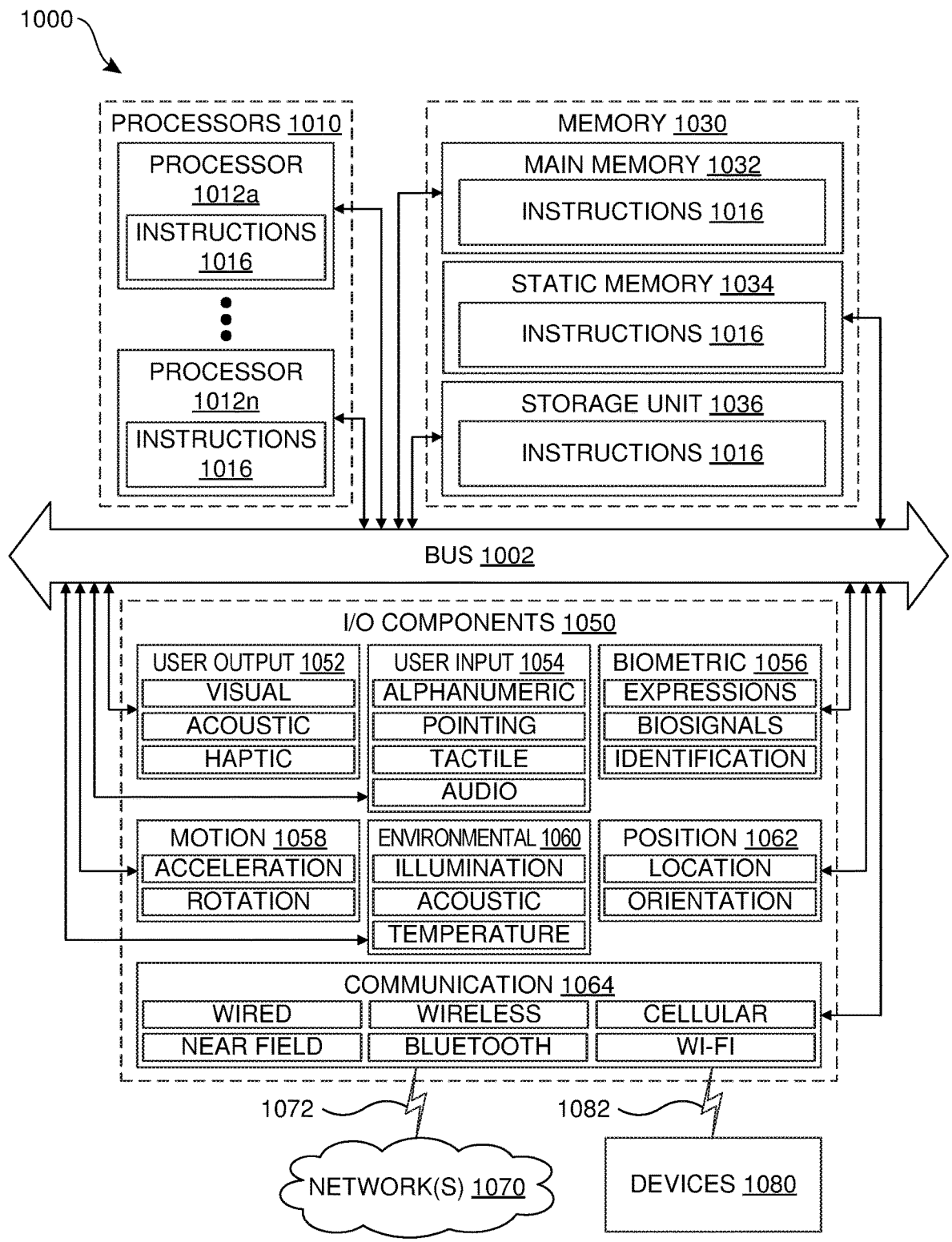
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" include a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A real-time audio communication system comprising:
one or more processors;
a machine-readable storage medium storing instructions which, when executed by the one of more processors, cause the system to:
receive a first audio transmission via a communication network;
generate a first initial audio signal based on at least the received first audio transmission;
supply the first initial audio signal to an audio signal processor configured to process the first initial audio signal and output a first processed audio signal to an audio output means;
obtain a first loopback audio signal corresponding to the first processed audio signal;
generate a first plurality of audio features for the first initial audio signal and the first loopback audio signal;
generate a first similarity measure estimating a similarity of the first initial audio signal to the first loopback audio signal based on at least the first plurality of audio features;
adjust an adaptation rate for an audio signal processing operation based on at least the first similarity measure; and
control, based on at least the adjusted adaptation rate, an echo cancellation process for cancelling an estimated echo from a near-end audio signal received via an audio input means in proximity to the audio output means.

2. The system of claim 1, wherein the instructions cause the adaptation rate to be increased in response to the first similarity measure indicating that the first initial audio signal and the first loopback audio signal are similar.

3. The system of claim 1, wherein the adjusting the adaptation rate includes adjusting an adaptation rate of a loopback audio signal noise estimation operation.

4. The system of claim 1, wherein the first plurality of audio features includes a scale invariant audio feature.

5. The system of claim 1, wherein:
the generating the first initial audio signal includes:
generating a preprocessed far-end audio signal based on at least the received first audio transmission, and
processing the preprocessed far-end audio signal to produce the first initial audio signal; and
the controlling the echo cancellation process is based on at least the adjusted adaptation rate and one or more far-end audio processing parameters indicating how the preprocessed far-end audio was classified and/or processed in connection with the processing of the preprocessed far-end audio signal.

6. The system of claim 1, wherein the instructions further cause the system to:
generate a first audio feature of a first type based on at least the first initial audio signal;
generate a second audio feature of the first type based on at least the first loopback audio signal; and
generate a compound audio feature based on a comparison of the first audio feature with the second audio feature,
wherein the first plurality of audio features includes the compound audio feature.

7. The system of claim 1, wherein the instructions further cause the system to:
receive a second audio transmission via the communication network;
generate a second initial audio signal based on at least the received second audio transmission;
supply the second initial audio signal to the audio signal processor to process the second initial audio signal and output a second processed audio signal to the audio output means, wherein the near-end audio signal includes a portion of the second processed audio signal output by the audio output means;
obtain a second loopback audio signal corresponding to the second processed audio signal; and
generate the estimated echo based on at least the second loopback signal.

8. The system of claim 1, wherein the generating a first similarity measure includes providing the first plurality of audio features as inputs to a machine-trained similarity model.

9. The system of claim 1, wherein the instructions further cause the system to:
receive a second audio transmission via the communication network;
generate a second initial audio signal based on at least the received second audio transmission;
obtain a second loopback audio signal corresponding to the second processed audio signal;
generate a second plurality of audio features for the second initial audio signal and the second loopback audio signal; and
generate a second similarity measure estimating a similarity of the second initial audio signal to the second loopback audio signal based on at least the second plurality of audio features,
wherein the generating the first similarity measure is based on at least the first plurality of audio features and the second similarity measure.

10. A method of processing audio signals, the method comprising:
receiving a first audio transmission via a communication network;
generating a first initial audio signal based on at least the received first audio transmission;
supplying the first initial audio signal to an audio signal processor configured to process the first initial audio signal and output a first processed audio signal to an audio output means;
obtaining a first loopback audio signal corresponding to the first processed audio signal;
generating a first plurality of audio features for the first initial audio signal and the first loopback audio signal;
generating a first similarity measure estimating a similarity of the first initial audio signal to the first loopback audio signal based on at least the first plurality of audio features;
adjusting an adaptation rate for an audio signal processing operation based on at least the first similarity measure; and
controlling, based on at least the adjusted adaptation rate, an echo cancellation process for cancelling an estimated echo from a near-end audio signal received via an audio input means in proximity to the audio output means.

11. The method of claim 10, wherein the adjusting an adaptation rate includes increasing the adaptation rate in response to the first similarity measure indicating that the first initial audio signal and the first loopback audio signal are similar.

12. The method of claim 10, wherein the adjusting the adaptation rate includes adjusting an adaptation rate of a loopback audio signal noise estimation operation.

13. The method of claim 10, wherein the first plurality of audio features includes a scale invariant audio feature.

14. The method of claim 10, wherein:
the generating the first initial audio signal includes:
generating a preprocessed far-end audio signal based on at least the received first audio transmission, and
processing the preprocessed far-end audio signal to produce the first initial audio signal; and
the controlling the echo cancellation process is based on at least the adjusted adaptation rate and one or more far-end audio processing parameters indicating how the preprocessed far-end audio was classified and/or processed in connection with the processing of the preprocessed far-end audio signal.

15. The method of claim 10, further comprising:
generating a first audio feature of a first type based on at least the first initial audio signal;
generating a second audio feature of the first type based on at least the first loopback audio signal; and
generating a compound audio feature based on a comparison of the first audio feature with the second audio feature,
wherein the first plurality of audio features includes the compound audio feature.

16. The method of claim 10, further comprising:
receiving a second audio transmission via the communication network;
generating a second initial audio signal based on at least the received second audio transmission;
supplying the second initial audio signal to the audio signal processor to process the second initial audio signal and output a second processed audio signal to the audio output means, wherein the near-end audio signal includes a portion of the second processed audio signal output by the audio output means;
obtaining a second loopback audio signal corresponding to the second processed audio signal; and
generating the estimated echo based on at least the second loopback signal.

17. The method of claim 10, wherein the generating a first similarity measure includes providing the first plurality of audio features as inputs to a machine-trained similarity model.

18. The method of claim 10, further comprising:
receiving a second audio transmission via the communication network;
generating a second initial audio signal based on at least the received second audio transmission;
obtaining a second loopback audio signal corresponding to the second processed audio signal;
generating a second plurality of audio features for the second initial audio signal and the second loopback audio signal; and
generating a second similarity measure estimating a similarity of the second initial audio signal to the second loopback audio signal based on at least the second plurality of audio features,
wherein the generating the first similarity measure is based on at least the first plurality of audio features and the second similarity measure.

19. A nontransitory machine-readable medium including instructions which, when executed by one or more processors, cause the one or more processors to perform the method of claim 10.

20. A real-time communication system comprising:
- means for receiving an audio transmission via a communication means;
- means for generating an initial audio signal based on at least the received audio transmission;
- means for processing the initial audio signal and outputting a processed audio signal to an audio output means;
- means for obtaining a loopback audio signal corresponding to the processed audio signal;
- means for generating a plurality of audio features for the initial audio signal and the loopback audio signal;
- means for generating a similarity measure estimating a similarity of the initial audio signal to the loopback audio signal based on at least the plurality of audio features;
- means for adjusting an adaptation rate for an audio signal processing operation based on at least the similarity measure; and
- means for controlling, based on at least the adjusted adaptation rate, an echo cancellation process for cancelling an estimated echo from a near-end audio signal received via an audio input means in proximity to the audio output means.

* * * * *